United States Patent Office 3,755,379
Patented Aug. 28, 1973

3,755,379
ANTHRAQUINONE COMPOUNDS
Henri Riat, Arlesheim, and Arthur Buehler, Rheinfelden, Switzerland, assignors to Ciba-Geigy AG, Basel, Switzerland
No Drawing. Filed Jan. 26, 1970, Ser. No. 5,939
Claims priority, application Switzerland, Jan. 28, 1969, 1,293/69
Int. Cl. C09b 1/34
U.S. Cl. 260—372          1 Claim

ABSTRACT OF THE DISCLOSURE

Compounds of the formula

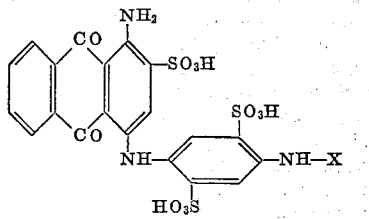

wherein X denotes a hydrogen atom or an acyl residue.

---

The introduction of a second sulphonic acid group into the phenylene residue of an anthraquinone dyestuff of the formula

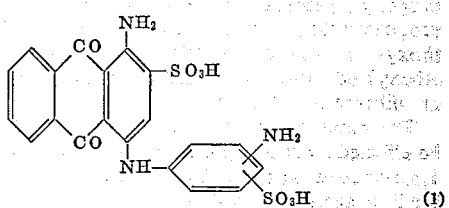

is of great industrial importance since the solubility of the dyestuff is increased and the substantivity of the dyestuff, for example of a reactive dyestuff manufactured therefrom, is reduced.

It is known from German specification 1,198,469, that 1-amino-4-(3'-aminophenylamino) - anthraquinone - 2,4'-disulphonic acid can be converted by direct sulphonation by means of sulphuric acid into the corresponding 2,4',6'-trisulphonic acid. It is also known that a sulphonic acid group is introduced into the 2'-position by sulphonation of 1-amino-4-(4'-aminophenylamino) - anthraquinone-2-sulphonic acid. Attempts to introduce a second sulphonic acid group into the phenyl residue under more severe experimental conditions have however been unsuccessful. Since indirect methods of introduction of sulphonic acid groups were in this case too involved, too expensive or even impossible to carry out, only those anthraquinone dyestuffs which contain at most one sulphonic acid group in the 4-(4'-aminophenylamino) residue have hitherto been known in industry. A need has therefore existed for a long time to find a method for the introduction of a second sulphonic acid group into the phenyl residue by sulphonation in a technically simple manner.

This invention is based on the surprising observation that the introduction of a second sulphonic acid group by direct sulphonation can be effected by starting from 1-amino-4-(4'-aminophenylamino) - anthraquinone - 2,3'-disulphonic acid.

The present invention thus provides new, valuable, water-soluble anthraquinone compounds of the general formula

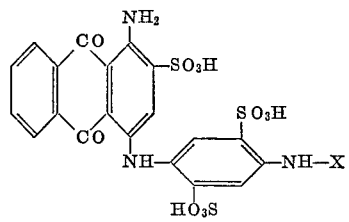

wherein X denotes a hydrogen atom or an acyl residue, especially a fibre-reactive acyl residue, as well as a new process for the manufacture of compounds of Formula 2, wherein compounds of the general formula

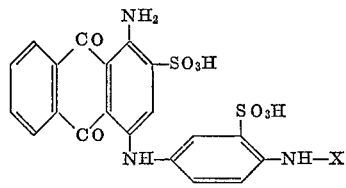

in which X denotes a hydrogen atom or an aliphatic acyl residue, are converted by sulphonation with oleum into compounds of Formula 2, wherein X denotes a hydrogen atom or an aliphatic acyl residue and, if desired, wherein X=hydrogen, subsequently treating with an acylating agent which preferably contains a fibre-reactive residue, to form compounds of Formula 2, wherein X denotes an acyl residue.

According to a modification of the process of the invention hydrogen halide may also be split off from an anthraquinone compound of Formula 2 or 3, wherein X denotes an α,β-dihalogenopropionyl residue, especially an α,β-dibromopropionyl residue, by treatment with an alkali after or before the sulphonation, the dihalogenopropionyl residue being converted into an α-halogenoacryl residue, especially an α-bromoacryl residue.

The compounds of Formula 3 to be used as starting materials according to the invention can be manufactured in known manner, for example by condensation of 1-amino-4-bromoanthraquinone-2-sulphonic acid with 1,4-diaminobenzene sulphonic acid in aqueous solution and in the presence of agents which split off acid, for example sodium carbonate.

The direct sulphonation of the starting compounds of Formula 3 is carried out with oleum, which advantageously contains 5 to 15% of sulphur trioxide, and at temperatures below 100° C., preferably at 50 to 70° C., the reaction mixture being well stirred. The reaction takes a considerable time, about 20 to 40 hours. After completion of the reaction the resulting trisulphonic acid of Formula 4 is separated, for example by precipitation as the free acid, or as the alkali metal salt or in the form of an acid alkali metal salt.

The acylation of the starting materials of Formula 4 with an acylating agent can take place in known manner, for example in an aqueous medium with the addition of acid-binding agents, for example sodium hydroxide or sodium carbonate.

Suitable acylating agents are, for example, acetyl chloride or benzoyl chloride, but especially those which contain a fibre-reactive residue. As acylating agents containing a fibre-reactive residue, the following may for example be mentioned: β-chloroacetyl chloride or bromide, β-chloropropionyl or β-bromopropionyl chloride or bromide, α,β-dichloropropionyl or α,β-dibromopropionyl chloride or bromide, acryl chloride, β-phenylsulphonyl-propionic acid chloride, α-chloroacryl or α-bromoacryl chloride or bromide, trichloroacryl chloride, chlorocrotonyl chloride, carbyl sulphate, propionic acid chloride, 3-nitro-4-chlorobenzene sulphonic acid chloride or carboxylic acid chloride, 2,2,3,3-tetrafluorocyclobutane-1-carboxylic acid chloride, 2,2,3,3-tetrafluorocyclobutyl-acrylic acid chloride, 4-ethyl-2,2,3,3-tetrafluorocyclobutylene(1,4)-acrylic acid chloride, and above all heterocyclic acid halides and their derivatives, for example the 2-chlorobenzoxazole carboxylic acid chlorides, 2-chlorobenzthiazole carboxylic acid chlorides or sulphonic acid chlorides, and in particular the following compounds possessing at least two nitrogen atoms as hetero-atoms of a 6-membered heterocyclic structure: 4,5-dichloro-1-phenyl-pyridazone carboxylic acid chloride or sulphonic acid chloride, 4,5-dichloropyridazone propionic acid chloride, 1,4-dichlorophthalazine carboxylic acid chloride or sulphonic acid chloride, 2,3-dichloroquinoxaline carboxylic acid chloride or sulphonic acid chloride, 2,4-dichloroquinazoline carboxylic acid chloride or sulphonic acid chloride, 2-methanesulphonyl-4,5-dichloro - 6 - methylpyrimidine, tetrachloropyridazine, trichloropyridazine-4-carboxylic acid chloride, 2,4-bis-methanesulphonyl-6-methyl-pyrimidine, 2,4,6-trichloropyrimidine or 2,4,5,6-tetrachloropyrimidine, 2,4,6-tribromopyrimidine or 2,4,5,6-tetrabromopyrimidine, 2-methanesulphonyl - 4,5 - dichloro-6-methylpyrimidine, 2,4-dichloropyrimidine - 5 - sulphonic acid, 5-nitro- or 5-cyano-2,4,6-trichloropyrimidine, 2,6-bis-methanesulphonylpyridine-4-carboxylic acid chloride, 5-nitro-6-methyl-2,4-dichloropyrimidine, 2,6 - dichloropyrimidine-4-carboxylic acid chloride, 2,6-dichloropyrimidine-5-carboxylic acid chloride, 2,4-dichloropyrimidine-4-sulphonic acid chloride, 2,4-dichloropyrimidine-5-sulphonic acid chloride, 2,4,5,6-tetrafluoropyrimidine, 2,4-difluoro-5,6-dichloropyrimidine, 2-chlorobenzthiazole-6-carboxylic acid chloride, 2-chlorobenzthiazole-6-sulphonic acid chloride, 2,4,6-trichloro-1,3,5-triazine as well as 2,4,6-tri-(benzenesulphonyl)-1,3,5-triazine and 4,6-dichloro-1,3,5-triazines which are substituted in the 2-position by an aryl or alkyl residue, for example a phenyl, methyl or ethyl residue, or by the residue of an aliphatic or aromatic mercapto compound bound through the sulphur atom or hydroxyl compound bound through the oxygen atom, or especially by a —NH$_2$ group or by the residue of an aliphatic, heterocyclic or aromatic amino compound bound through the nitrogen atom. As such compounds, the residues of which can be bound to the triazine nucleus by reaction with trihalogenotriazines in the 2-position, the following may for example be mentioned: aliphatic or aromatic mercapto or hydroxyl compounds, for example thioalcohols, thioglycollic acid, thiourea, thiophenols, methyl, ethyl and isopropyl alcohol, alkoxyalkanols, glycollic acid, phenol, chlorophenols or nitrophenols, phenol carboxylic acids and phenol sulphonic acids, naphthols, naphthol sulphonic acids and the like, but especially ammonia and compounds containing amino groups which can be acylated, for example hydroxylamine, hydrazine, phenylhydrazine, phenylhydrazine sulphonic acids, carbamic acid and its derivatives, semicarbazides and thiosemicarbazides and semicarbazones and thiosemicarbazones, methylamine, ethylamine, isopropylamine, methoxyethylamine, methoxypropylamine, dimethylamine, diethylamine, methylphenylamine, ethylenephenylamine, chlorethylamine, ethanolamines, propanolamines, benzylamine, cyclohexylamine, morpholine, piperidine, piperazine, aminocarbonic acid esters, aminoacetic acid ethyl ester, aminoethane sulphonic acid, N-methylaminoethane sulphonic acid, but above all aromatic amines, for example aniline, N-methylaniline, toluidines, xylidines, chloranilines, p- or m-aminoacetanilide, nitroanilines, aminophenols, nitrotoluidines, phenylenediamines, toluylenediamines, anisidine, phenetidine, diphenylamine, naphthylamines, aminonaphthols, diaminonaphthalenes and especially anilines containing acid groups, for example, sulphobenzylamine, sulphanilic acid, metanilic acid, orthanilic acid, aniline disulphonic acids, aminobenzylsulphonic acids, aniline-ω-methane sulphonic acid, aminodibenzoic acids, naphthylamine monosulphonic, disulphonic and trisulphonic acids, aminobenzoic acids, for example 2-hydroxy-5-aminobenzoic acid, aminonaphthol monosulphonic, disulphonic and trisulphonic acids and the like, and also coloured compounds or compounds possessing dyestuff characteristics, for example 4-nitro-4'-aminostilbene disulphonic acid, 2-nitro-4'-aminodiphenylamino-4,3'-stilbene disulphonic acid, 2-nitro-4'-aminodiphenylamine-4,3'-disulphonic acid and especially aminoazo dyestuffs or aminoanthraquinones or phthalocyanines which still contain at least one reactive amino group.

The introduction of the substituent which is in the 2-position of the triazine residue can take place before or after the condensation with the starting amine.

Amongst the compounds of Formula 2, wherein X denotes a triazine residue which contains an alkoxy group in the 2-position, those in which an etherified alkyl group is bound to the alkoxy group are important.

As acylating agents which contain an alkoxyhalogenotriazine residue in which an etherified alkyl group is bound to the alkoxy group, whereby there are also to be understood cyclic ether groupings, for example the oxacyclopentyl residue, those triazines are of particular value which possess an optionally branched alkylene bridge containing at least two and preferably at most four carbon atoms. As examples of such alkoxy groups there may be mentioned: β-methoxy-ethoxy-, γ-methoxy-propoxy-, methoxy-isopropoxy-, γ-methoxy-butoxy-, δ-methoxy-butoxy-, β-ethoxy-ethoxy-, ethoxy-isopropoxy-, ethoxy-butoxy-, ethoxy-isobutoxy-, β-propoxy-ethoxy-, γ-propoxy-propoxy-, γ-isopropoxy-propoxy-, β-n-butoxy-ethoxy-, isopropoxy-butoxy, n - hexoxy-ethoxy-, oxacyclopentylmethoxy-, β - (β - methoxyethoxy)-ethoxy-, β - (β - ethoxyethoxy)-ethoxy-, β-(β-isopropoxyethoxy)-ethoxy-dichloro- or -dibromo-1,3,5-triazine.

The manufacture of these alkoxyhalogenotriazines can be effected by reacting a 2,4,6-trichloro- or 2,4,6-tribromo-1,3,5-triazine with an alcohol in the presence of an acid-binding agent, preferably in the absence of water.

Suitable alcohols which can be used for the condensation are the alkoxyalkanols which correspond to the alkoxy-alkoxy groups, for example ethoxyethanol, isopropoxypropanol, hexoxyethanol, methoxybutanol and others.

In the compounds obtained by condensation according to the present process, the mobile halogen atoms of the fibre-reactive substituents can be easily replaced, for example by reaction with tertiary amines or with hydrazines (for example dimethylhydrazine), whereby fibre-reactive compounds are produced of which the substituent which can be split off is a quaternary ammonium or hydrazinium group bound to a carbon atom, especially of a heterocyclic residue, that is to say for example a group of the formula

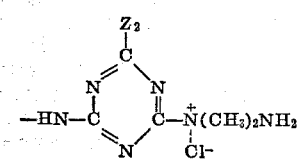

wherein Z$_2$ denotes an etherified hydroxyl group.

The compounds obtained according to the invention by sulphonation and acylation are new. They can be used as dyestuffs and are suitable for dyeing and printing the most diverse materials, especially polyhydroxylated materials, for example cellulose-containing materials of fibrous structure, for example linen, regenerated cellulose and cotton. They have excellent build-up properties and are particularly suitable for dyeing according to the so-called pad dyeing process, according to which the goods are impregnated with aqueous dyestuff solutions which may also contain salt, and the dyestuffs are fixed after an alkali treatment or in the presence of alkali, with or without heating. The compounds manufactured according to the invention are also suitable for printing.

The processes and the direct dyeing methods which can also be used with many of the compounds obtained according to the present process, lead to dyeings and prints which are distinguished by particular purity of their colour shades. Those compounds which carry a reactive group are distinguished by increased reactivity, very good light fastness and above all by outstanding wet fastness properties. The compounds manufactured according to the invention are furthermore distinguished by a high degree of fixing and easy removability of the non-fixed components.

The compounds obtained according to the invention are also suitable for dyeing nitrogen-containing fibres, for example polyamides, polyurethanes, silk, leather and especially wool, for example from a weakly acid, neutral or weakly alkaline bath, optionally with the addition of the usual auxiliary agents, for example ethylene oxide condensation products of high molecular amines.

They are also suitable for printing nitrogen-containing fibres, for example wool, silk or mixed fabrics containing wool.

In order to improve the wet fastness properties it is advisable to subject the dyeings and prints thus obtained to a thorough rinsing with cold and hot water, if desired with the addition of an agent which has a dispersing action and promotes the diffusion of the unfixed components.

In the examples which follow, the parts, unless otherwise stated, denote parts by weight, and the percentages denote percentages by weight. The relationship of parts by weight to parts by volume is the same as that of the gram to the cubic centimetre.

EXAMPLE 1

489 parts of 1-amino-4-(4'-aminophenylamino)-anthraquinone-2,3'-disulphonic acid are introduced in portions into a mixture of 4210 parts of sulphuric acid monohydrate and 2200 parts of 24% oleum. The mixture is stirred for 20 hours at 50° C. and 10 hours at 60° C. and poured into a mixture of ice and sodium chloride. The trisulphonic acid which precipitates is filtered and washed with a saturated sodium chloride solution until the filtrate only reacts weakly acid to Congo Red. The yield is 85 to 90% of theory. The product can be purified by dissolving in water and reprecipitating with sodium chloride. It dissolves in water to give a blue colour.

An analysis of the sulphonation product obtained gave a ratio of nitrogen to sulphur of almost 3:3. 1,4-diaminobenzene-2,5-disulphonic acid was obtained by reductive splitting; this establishes the position of the $SO_3H$ group introduced.

EXAMPLE 2

56.9 parts of 1-amino-4-(4'-aminophenylamino)-anthraquinone-2,2',5'-trisulphonic acid (manufactured according to the data in Example 1) are dissolved in 800 parts of water and neutralised with sodium carbonate. The mixture is cooled to 0° C. and a solution of 18.5 parts of cyanuryl chloride in 100 parts of acetone is added. The mixture is stirred for 2 hours at between 0 and 5° C. and is neutralised with a dilute sodium hydroxide solution. After adding 4 parts of disodium phosphate and 2 parts of monosodium phosphate, the dichlorotriazine dyestuff is salted out with sodium chloride, isolated by filtration and dried at 50° C. in vacuo. It dissolves in water to give a blue colour and dyes cellulose fibres brilliant blue shades.

When instead of cyanuryl chloride the corresponding amounts of 2,3-dichloroquinoxaline-6-carboxylic acid chloride or 2-chlorobenzthiazole-6-carboxylic acid chloride is used and condensation is carried out at about 20° C., dyestuffs having similar properties are obtained.

When instead of cyanuryl chloride the corresponding amount of cyanuryl bromide is used, a dyestuff having similar properties is obtained.

EXAMPLE 3

A neutral solution of 17.3 parts of 1-aminobenzene-3-sulphonic acid is added to the solution of the dichlorotriazine dyestuff obtained according to Example 2. The mixture is stirred for 2 hours at 30° C. and is gradually neutralised with a dilute sodium hydroxide solution. After completion of the condensation, the dyestuff is salted out, filtered and dried. It dyes cotton fast blue shades.

When instead of 1-aminobenzene-3-sulphonic acid a corresponding amount of 1-aminobenzene-2-sulphonic acid or -4-sulphonic acid, 1-aminobenzene-2-carboxylic acid or -3-carboxylic acid, aniline, p-toluidine, 1-methyl-2-aminobenzene-4-sulphonic acid, 1-aminobenzene-2-carboxylic acid-4-sulphonic acid, N-methylaniline, 1-aminonaphthalene-4-sulphonic acid or -6-sulphonic acid is used, dyestuffs having similar properties are obtained.

EXAMPLE 4

56.9 parts of 1-amino-4-(4'-aminophenylamino)-anthraquinone-2,2',5'-trisulphonic acid are dissolved in 800 parts of water and neutralised with sodium carbonate. 25 parts of 2,4-dichloro-6-(β-ethoxyethoxy)-triazine are added at 30° C. and the mixture is stirred for 2 hours at between 30 and 40° C., the hydrochloric acid formed during the condensation being continuously neutralised with dilute sodium hydroxide solution. The dyestuff formed is then salted out, filtered and dried. It dyes cotton fast blue shades.

When a corresponding amount of 2-methoxy-4,6-dichlorotriazine, 2-ethoxy-4,6-dichlorotriazine or 2-isopropoxy-4,6-dibromotriazine is used as the acylating agent, dyestuffs having similar properties are obtained.

EXAMPLE 5

50 parts of a 10% aqueous ammonia solution are added to the solution of the dichlorotriazine dyestuff obtained according to Example 2, and the mixture is condensed for 3 hours at 40° C. A dyestuff which dyes cotton fast blue shades is obtained.

When ethylamine, ethanolamine, diethanolamine, methoxyethylamine or morpholine are used instead of ammonia, dyestuffs having similar properties are obtained.

EXAMPLE 6

An aqueous solution of 9.4 parts of phenol which contains 4 parts of sodium hydroxide is added to the solution of the dichlorotriazine dyestuff obtained according to Example 2, and the temperature is kept at 40° C. for one hour. The resulting dyestuff dyes cotton fast blue shades.

When instead of phenol the corresponding amount of phenol-4-sulphonic acid is used, a dyestuff having similar properties is obtained.

EXAMPLE 7

35 parts of 2-phenylamino-4,6-dichlorotriazine-3'-sulphonic acid are added at 50° C. to a solution of 56.9 parts of 1-amino-4-(4'-aminophenylamino)-anthraquinone-2,2',5'-trisulphonic acid in 800 parts of water which has been neutralised with sodium carbonate, and the mixture is stirred at 60° C. at a pH-value of 6 until the condensation is complete. The resulting dyestuff possesses the same properties as that of Example 3.

When 25 parts of tetrachloropyrimidine or 2,4,6-trichloropyrimidine or 4-methyl-2-methylsulphonyl-5,6-dichloropyrimidine (or the corresponding amount of the bromine derivatives) are used as the acylating agent and the condensation carried out at about 90° C., dyestuffs are obtained which also dye cotton blue shades.

EXAMPLE 8

A solution of 54.5 parts of the monoazo dyestuff from diazotised 2-naphthylamine-3,6,8-trisulphonic acid and 3-amino-1-ureidobenzene is added to a solution of the dichlorotriazine dyestuff obtained according to Example 2. The mixture is kept for about 6 hours at between 60 and 70° C. and at a pH-value of 6, until the condensation is complete. The resulting dyestuff is then salted out and filtered. The crude dyestuff solution can also be conveniently spray-dried. The resulting dyestuff dyes cellulose fibres olive shades.

EXAMPLE 9

14.06 parts of 1-amino-4-(4'-α,β-dibromopropionyl-aminophenylamino)-anthraquinone-2,3'-disulphonic acid are introduced into a mixture of 84 parts of sulphuric acid monohydrate and 44 parts of 24% oleum and stirred for 6 hours at 40 to 50° C. and then for 44 hours at 59 to 61° C. The solution is poured into a mixture of ice and sodium chloride. The product which precipitates is filtered and washed with sodium chloride solution. The resulting filter cake is dissolved in water and adjusted with sodium hydroxide solution to pH 7; the resulting trisulphonic acid dyestuff is precipitated by adding sodium chloride, filtered and dried. A blue powder is obtained.

EXAMPLE 10

56.9 parts of 1-amino-4-(4'-aminophenylamino)-anthraquinone-2,2',5'-trisulphonic acid are dissolved in 1000 parts of water and accurately neutralised with dilute sodium hydroxide solution. 50 parts of dibromopropionyl chloride are added dropwise to the solution during 2 hours at 5 to 10° C., the pH of the mixture being constantly maintained at between 7 and 7.5 by simultaneous addition of dilute sodium hydroxide solution. After completion of the acylation the dyestuff is precipitated by adding 50 parts of sodium chloride, filtered and washed with 10% sodium chloride solution. When dried, it is a blue powder which dissolves in water to give a deep blue colour and dyes wool, with the optional addition of an oleylamine-ethylene oxide addition product, pure blue shades. The dyeing has very good fastness properties.

When the dibromopropionyl derivative is dissolved in water, adjusted to pH 12 with NaOH at 10 to 15° C. and stirred for about one hour to split off hydrogen bromide, a bromoacryl derivative of good solubility in water having the same shade and equally good fastness properties is obtained.

Dyeing instruction 2 parts of the dyestuff of Example 2, 1st paragraph, are dissolved in 100 parts of water.

A cotton fabric is impregnated with this solution on a padder and the excess liquid is squeezed so that the fabric retains 75% of its weight of dyestuff solution.

The goods treated in this way are dried, impregnated at room temperature in a solution which contains per litre 10 g. of sodium hydroxide and 300 g. of sodium chloride, squeezed to 75% liquid uptake, and steamed for 60 seconds at 100 to 101° C. They are then rinsed, soaped for quarter of an hour in a 0.3% solution of a non-ionic detergent at the boil, rinsed and dried.

A dyeing which is fixed so as to be fast to boiling is obtained. When a rayon fabric is used instead of a cotton fabric, a similar good result is obtained.

Printing instruction 2 parts of the dyestuff obtained according to Example 3 are mixed with 20 parts of urea, dissolved in 28 parts of water and stirred into 40 parts of a 5% sodium alginate thickener; 10 parts of a 10% sodium carbonate solution are then added.

A cotton fabric is printed with this printing paste on a roller printing machine, dried, and the resulting print is steamed for 8 minutes at 105° C. The printed fabric is then thoroughly rinsed in cold and hot water and dried.

Dyeing instruction 100 parts of wool knitting yarn are introduced at 50 to 80° C. into a dyebath which contains 10 parts of crystalline sodium sulphate, 6 parts of 40% acetic acid, 0.5 part of the addition product of oleylamine and ethylene oxide described below and 2 parts of the dyestuff described in Example 10, in 3000 parts of water. The bath is heated to the boil during half an hour and dyeing is then carried out for one hour at the boil. Thereafter the wool is rinsed and dried. A uniform blue dyeing is obtained.

Manufacture of the ethylene oxide addition product 100 parts of technical oleylamine are mixed with 1 part of finely divided sodium and heated to 140° C., after which ethylene oxide is introduced at 135 to 140° C. As soon as the ethylene oxide is rapidly absorbed, the reaction temperature is reduced to 120 to 125° C. and the introduction of the ethylene oxide is continued until 113 parts of ethylene oxide have been taken up. The reaction product obtainable in this way forms a practically clear solution in water.

What is claimed is:
1. The dyestuff of the formula

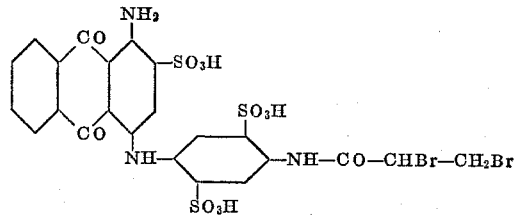

References Cited
UNITED STATES PATENTS
3,501,505  3/1970  Buehler et al. _____ 260—372
3,316,239  4/1967  Riat et al. _____ 260—372

LORRAINE A. WEINBERGER, Primary Examiner

E. J. SKELLY, Assistant Examiner

U.S. Cl. X.R.

8—39, 40; 260—249, 256.5 R, 262, 272, 303, 307.5, 374